J. H. SEARLE.
LUBRICATOR.
APPLICATION FILED JAN. 29, 1909.
956,436.
Patented Apr. 26, 1910.
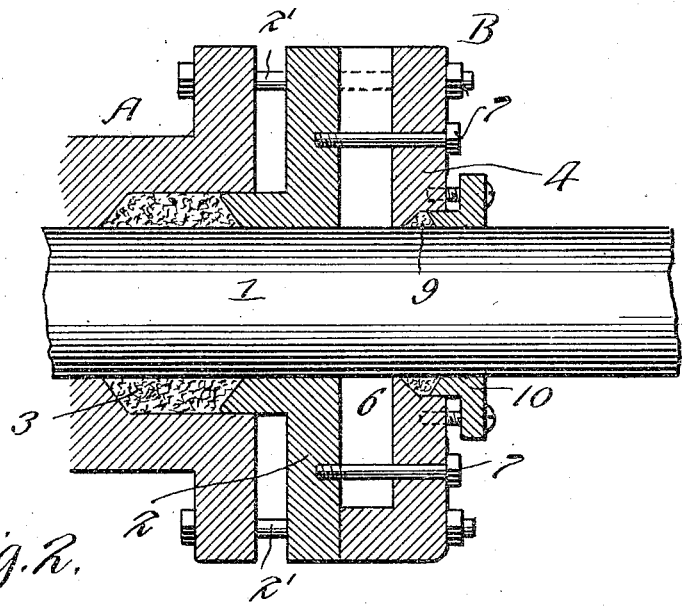
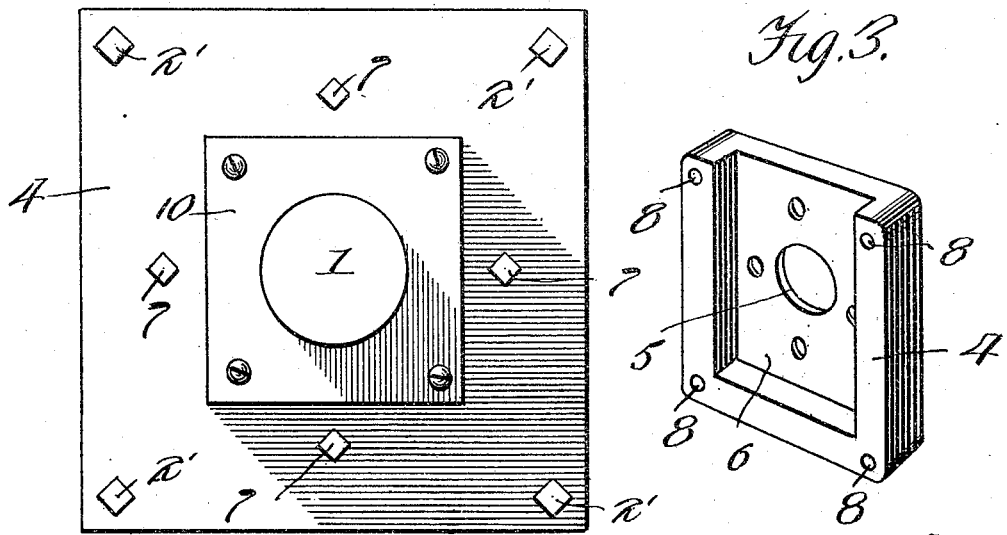
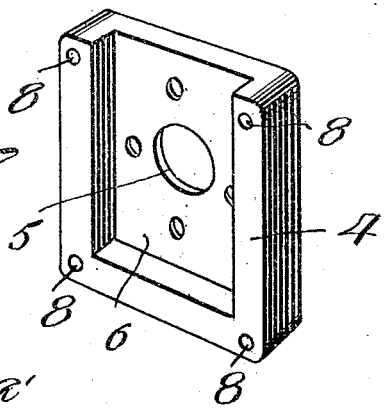
Witnesses
Hugh H. Ott
K. Allen.
Inventor
Joseph H. Searle
By Victor J. Evans
Attorney

UNITED STATES PATENT OFFICE.

JOSEPH HENRY SEARLE, OF MINERSVILLE, PENNSYLVANIA.

LUBRICATOR.

956,436.  Specification of Letters Patent.  Patented Apr. 26, 1910.

Application filed January 29, 1909. Serial No. 474,903.

*To all whom it may concern:*

Be it known that I, JOSEPH HENRY SEARLE, a citizen of the United States, residing at Minersville, in the county of Schuylkill and State of Pennsylvania, have invented new and useful Improvements in Lubricators, of which the following is a specification.

This invention relates to a lubricator or grease box adapted for use in connection with reciprocating elements such as piston rods, valve stems and the like.

The invention has for one of its objects to improve and simplify the construction of devices of this character so as to be comparatively simple and inexpensive to manufacture, reliable and efficient in use, and designed as an attachment for use on apparatus already in use.

Another object of the invention is the provision of a grease box adapted to be applied to the gland of a packing box for applying lubricant to a rod or shaft as it moves in and out of the stuffing box.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one embodiment of the invention, Figure 1 is a detail sectional view of a stuffing box showing the grease box attached thereto. Fig. 2 is a front view of the grease box. Fig. 3 is a perspective view of one section of the grease box detached.

Similar reference characters are employed to designate corresponding parts throughout the views.

Referring to the drawing, 1 designates a reciprocatory element, such for instance, as a valve stem, piston rod or the like which moves in and out of a stuffing box A of ordinary construction. The gland 2 of the stuffing box, by which the packing material 3 is compressed supports the grease box designated generally by B. This box consists of a metal plate 4 which has an opening 5 through which the shaft or element 1 extends, and one side of the plate is provided with a chamber 6 which is open at one side and also at the top.

The plate 4 is presented to the disk portion of the gland 2 so that the latter forms a closure for the open side of the chamber 6. In other words, the gland constitutes one section of the grease box. The two sections of the grease box are secured together by bolts 7 that pass through openings 8 in the plate 4 and enter threaded openings in the gland 2. When the bolts 7 are removed the plate 4 can be slipped along the element 1 when it is desired to open the grease box for cleaning. The grease box is secured to the stuffing box by means of bolts 2′ which pass through corresponding openings in the parts 2 and 4 and in the flange of the stuffing box A. The grease box may be moved away from the stuffing box to admit of replacing the packing 3 or for any other purpose by loosening the nuts upon the outer ends of the bolts 2′. After the nuts have been removed from the bolts 2′ the grease box may be slipped along the rod or reciprocatory element 1. The bolts 7 prevent separation of the sections or elements 2 and 4 comprising the grease box. In the opening 5 of the plate 4 is a packing ring 9 which snugly fits around the element 1 so that the lubricant or oil will not flow out of the box where the element 1 passes through the same, said ring being held in place by a retainer 10. By having the chamber 6 open at the top, the grease box can be recharged from time to time with lubricant. By maintaining a body of lubricant in the chamber 6 around the shaft or element 1, the latter will be thoroughly lubricated as it moves back and forth.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what I claim is:—

In combination with a packing box and a reciprocatory element arranged to operate therein, a gland for retaining the packing material in the packing box, a plate having the side adjacent the gland chambered and open at the top to form a container for receiving the lubricant, said plate having an opening to receive the reciprocatory element, a packing fitted in the opening of the plate, a retainer secured to the plate for holding the packing in place, means for securing the plate to the gland, and other means for connecting the grease box or gland and chambered plate to the packing box.

In testimony whereof I affix my signature in presence of two witnesses.

JOSEPH HENRY SEARLE.

Witnesses:
RICHARD M. ADAMS, Jr.,
FRED GILMARTIN.